United States Patent Office.

LEVI ROGERS, OF MOREHOUSE PARISH, LOUISIANA.

Letters Patent No. 78,018, dated May 19, 1868.

IMPROVED MEDICAL COMPOUND.

The Schedule referred to in these Letters Patent and making part of the same.

TO ALL WHOM IT MAY CONCERN:

Be it known that I, LEVI ROGERS, of the parish of Morehouse, in the State of Louisiana, have invented a certain new and useful Composition of Matter to be used as a Medicine; and I do hereby declare the following to be a full, clear, and exact description of the same, and of my method of compounding and using it.

I put into one gallon and a half of distilled water one pound of green swamp-palmetto root, that has been cut into small pieces, or otherwise reduced to a finely-divided state, and boil slowly in any proper retort or vessel until the admixture has been evaporated to dryness. The residuum is then placed in a proper receptacle, and pulverized into the form of powder, when it is ready for use, either in that form or in the form of pills, which can be made by any of the usual methods.

My compound is a certain specific and remedy for a great variety of diseases, among which are all those that affect the organs of generation or the parts connected therewith, and certain local disorders of the throat, as to which it is especially efficacious and speedy in its action or operation. It is also a never-failing remedy for piles.

A dose for an adult is from eight to twelve grains, according to the condition of the patient.

Having thus described my invention, what I claim, and desire to secure by Letters Patent, is—

The medical compound herein described, when composed of the ingredients herein mentioned in the proportions stated, and compounded by the method and for the purpose set forth.

LEVI ROGERS.

Witnesses:
RUFUS R. RHODES,
LYMAN HARDING.